United States Patent [19]

Leese et al.

[11] Patent Number: 4,652,409

[45] Date of Patent: Mar. 24, 1987

[54] WEB-STRETCHING PROCESS

[75] Inventors: Leonard Leese; Donald C. Nicholas, both of Manningtree; Gordon C. R. Smith, Colchester; Geoffrey F. Stokes, Dovercourt, all of England

[73] Assignee: Bakelite Xylonite Limited, United Kingdom

[21] Appl. No.: 674,145

[22] Filed: Nov. 23, 1984

Related U.S. Application Data

[63] Continuation of Ser. No. 529,888, Sep. 6, 1983, abandoned, which is a continuation of Ser. No. 211,070, Nov. 28, 1980, abandoned, which is a continuation of Ser. No. 899,456, Apr. 24, 1978, abandoned, which is a continuation of Ser. No. 479,158, Jun. 13, 1974, abandoned.

[51] Int. Cl.$^4$ .............................................. B29C 55/14
[52] U.S. Cl. .................................... 264/22; 264/175; 264/210.6; 264/210.7; 264/290.2
[58] Field of Search .............. 26/73; 264/290.2, 210.6, 264/210.7, 22, 175, 235.8

[56] References Cited

U.S. PATENT DOCUMENTS

| | | |
|---|---|---|
| 3,148,409 | 9/1964 | Bruckner . |
| 3,153,812 | 10/1964 | Sakakibasa et al. . |
| 3,195,177 | 7/1965 | Kawamura et al. . |
| 3,256,558 | 6/1966 | Andersen et al. . |
| 3,427,684 | 2/1969 | Tsien . |
| 3,445,887 | 5/1969 | Tsien . |
| 3,775,521 | 11/1973 | Yamamoto et al. . |

Primary Examiner—James Lowe
Attorney, Agent, or Firm—Millen & White

[57] ABSTRACT

A process for producing a stretched web of plastics material wherein a web of plastics material is passed through an apparatus in which the web, gripped at its edges by web gripping devices mounted on carriages which run on guide rails is stretched by increasing the distance between adjacent gripping devices by altering the degree of extension of an articulated chain to which the carriages are attached.

18 Claims, 10 Drawing Figures

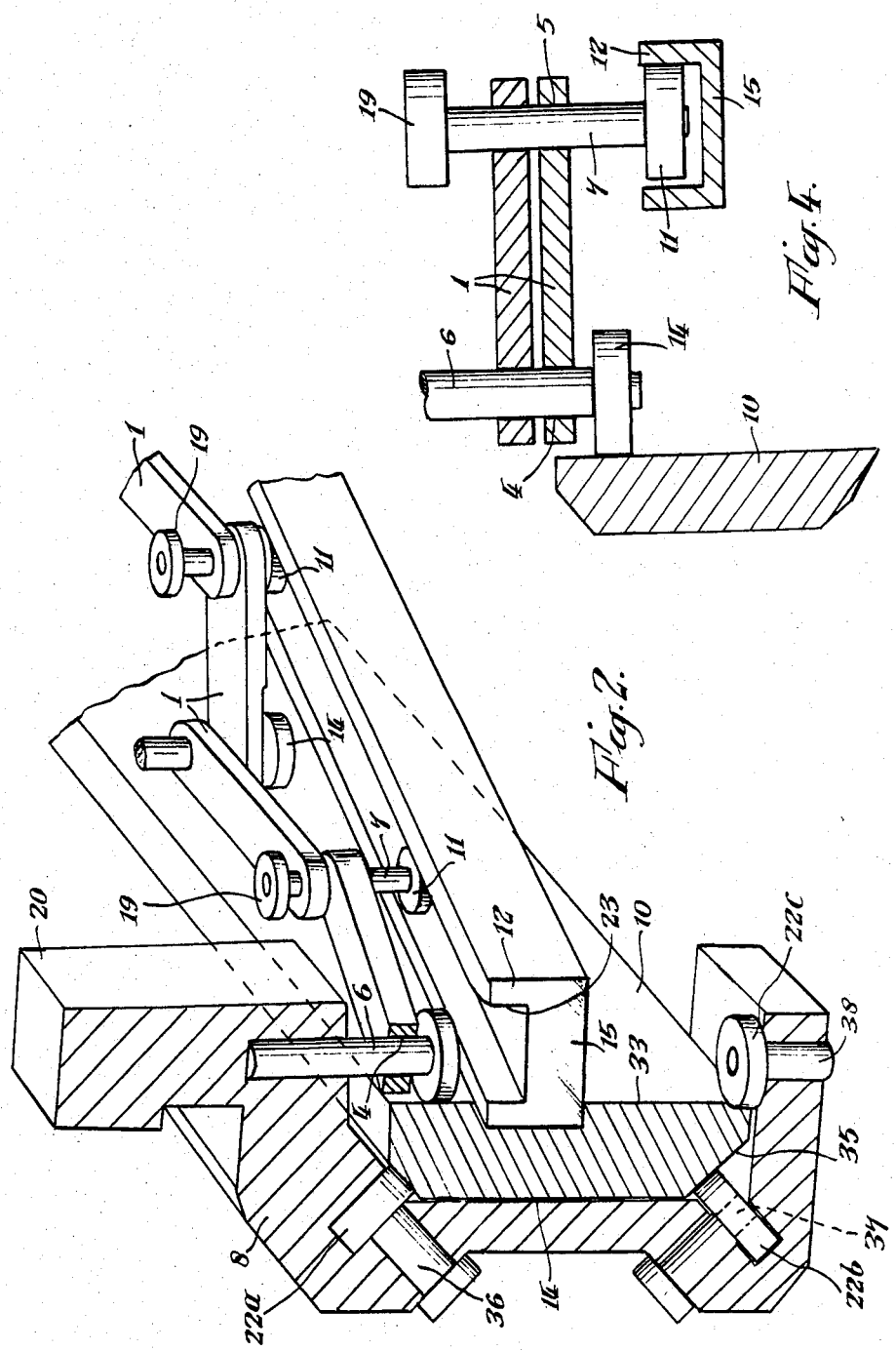

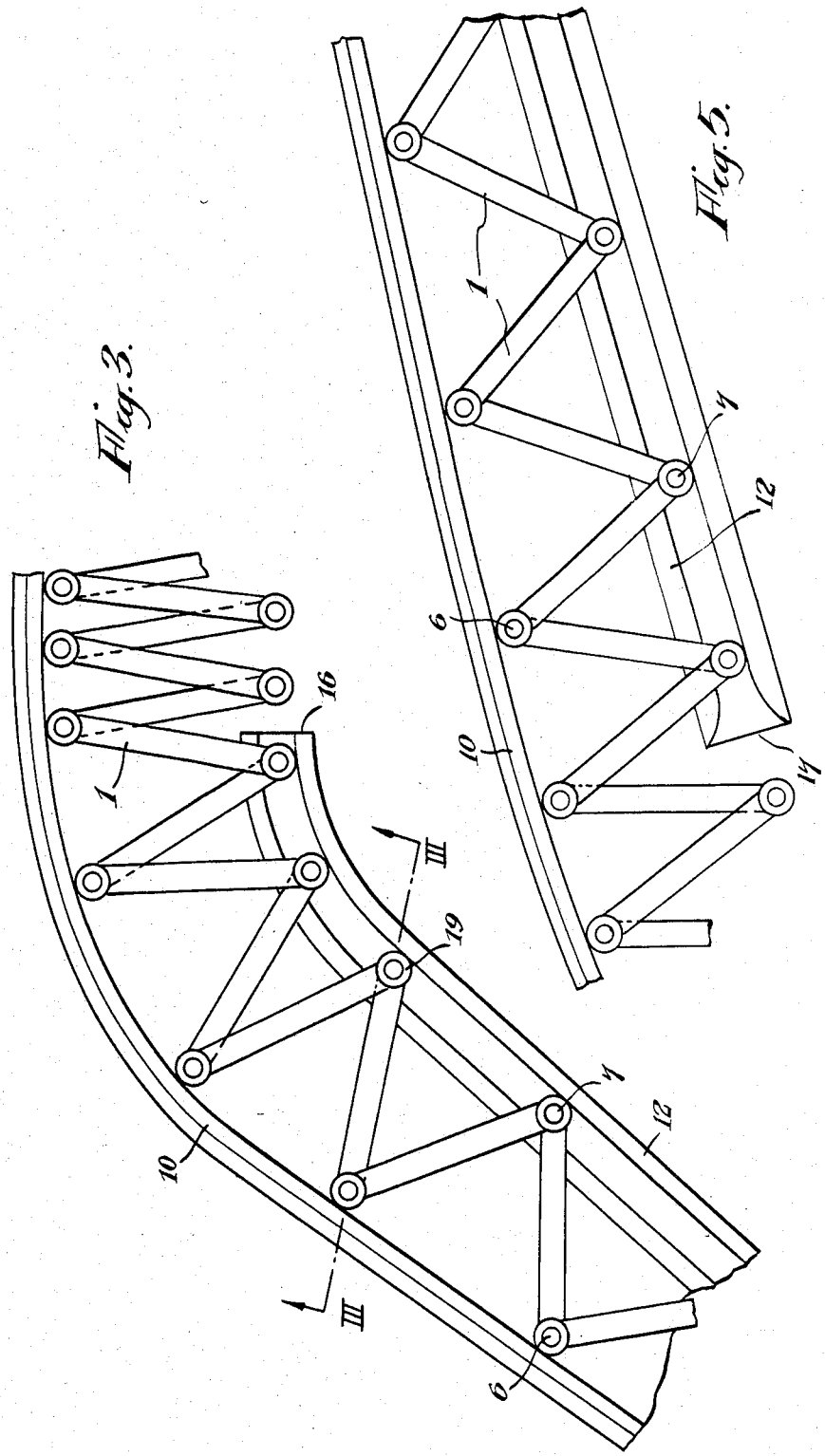

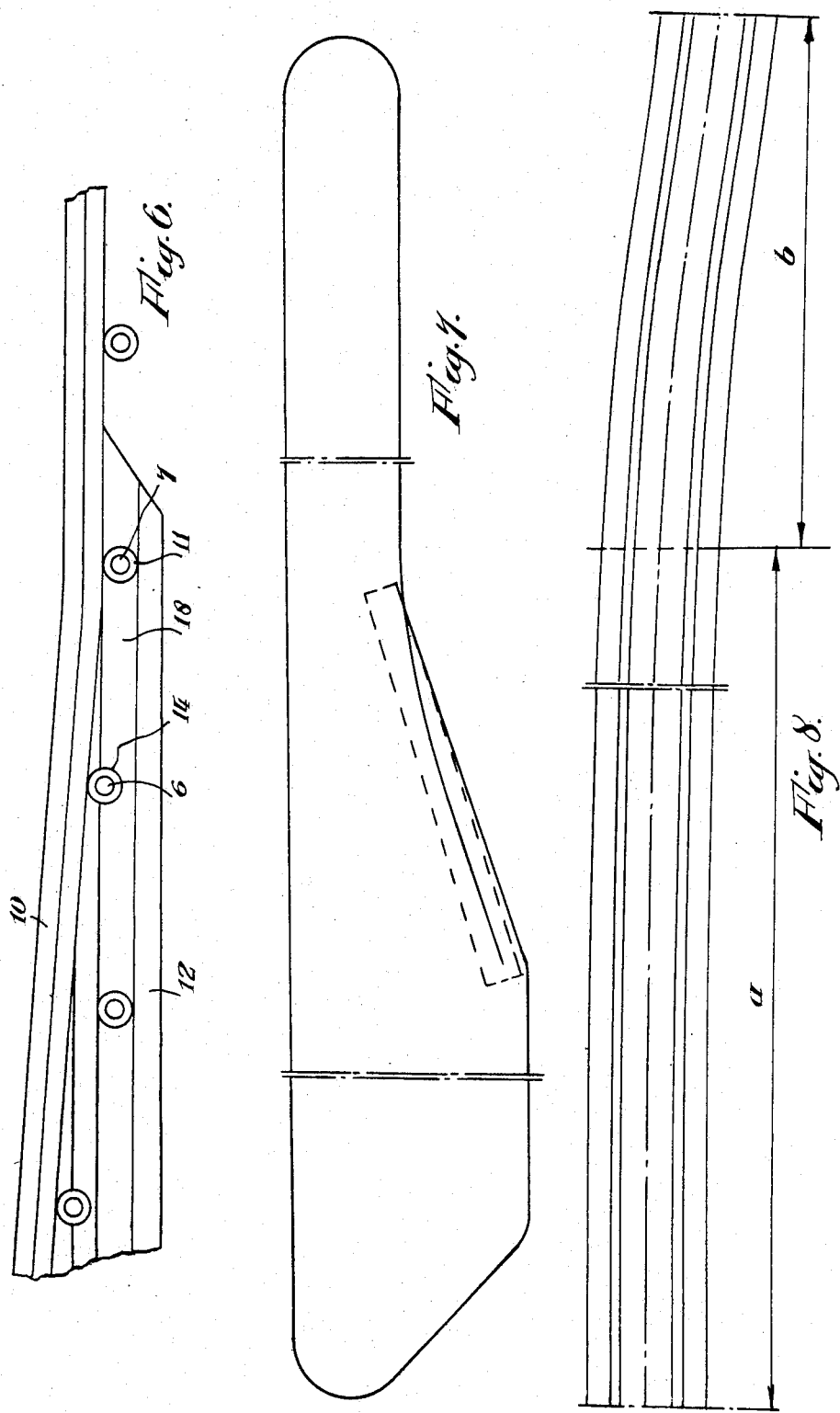

WEB-STRETCHING PROCESS

BACKGROUND OF THE INVENTION

This is a continuation of Ser. No. 529,888, filed Sept. 6, 1983; which was a continuation of Ser. No. 211,070, filed Nov. 28, 1980; which was a continuation of Ser. No. 899,456, filed Apr. 24, 1978; and which was a continuation of Ser. No. 479,158, filed June 13, 1974, all now abandoned.

This invention relates to a process for the production of a stretched web of plastics material. Commonly assigned U.S. Pat. No. 4,614,011, the disclosure of which is herein incorporated by reference, describes an apparatus for use in the production of a stretched web of material and which in its broadest aspect comprises two endless articulated chains positioned to run along opposite sides of a moving web to be stretched, a plurality of web-gripping devices mounted at intervals along the length of each chain, primary and secondary guide means for each chain for guiding the chain along the closed path in such a way that the degree of folding of the links of the chain can be varied at different points along the path so varying the distance between adjacent gripping devices, primary and secondary guide members attached to each link of each chain and arranged to engage the primary and secondary guide means, respectively, and means for causing the web gripping devices to grip and hold the web at a desired point along the path of each chain and to release the web at a second desired point along the path of each chain characterised in that each primary guide member is a wheeled carriage arranged to ride on the primary guide means in such a way that each carriage can move along its associated primary guide means with wheels in rolling contact therewith while being substantially restrained by the reaction between wheels and the primary guide means against rotation about about three mutually perpendicular axes. This apparatus described in the above mentioned application has now been found to be particularly useful in the manufacture of stretched sheet materials from thermoplastics resins and especially in the manufacture from such resins of biaxially-stretched sheet which has properties characteristic of and normally associated with paper in addition to some of the other more desirable characteristic properties of polymeric sheets.

SUMMARY OF THE INVENTION

According to this invention there is provided a process for the manufacture of a stretched plastic web wherein a web comprising a thermoplastics resin is stretched uniaxially or biaxially by passing it through a stretching apparatus as described in application Ser. No. 369,609, filed June 13, 1973.

BRIEF DESCRIPTION OF THE DRAWINGS

Apparatus in accordance with application Ser. No. 369,609 for use in the present invention will now be described by way of example only with reference to the drawings in which only one half of the apparatus is shown, the other half being a mirror image.

In the drawings:

FIG. 2 shows a perspective view of a part-section along the line I—I in FIG. 1;

FIG. 3 shows an enlarged plan view of part of the apparatus enclosed by Box II in FIG. 1;

FIG. 4 shows a cross-sectional view along the line III—III in FIG. 3;

FIG. 5 shows an enlarged plan view of a part of the apparatus enclosed by Box IV in FIG. 1;

FIG. 6 shows an enlarged plan view of a part of the apparatus enclosed by Box V in FIG. 1;

FIG. 7 shows in a general way, a modification to the apparatus shown in FIG. 1;

FIG. 8 is an enlarged plan view of the part of the apparatus enclosed by Box VI in FIG. 7;

DESCRIPTION OF THE PREFERRED EMBODIMENT

Figures 1, 10:
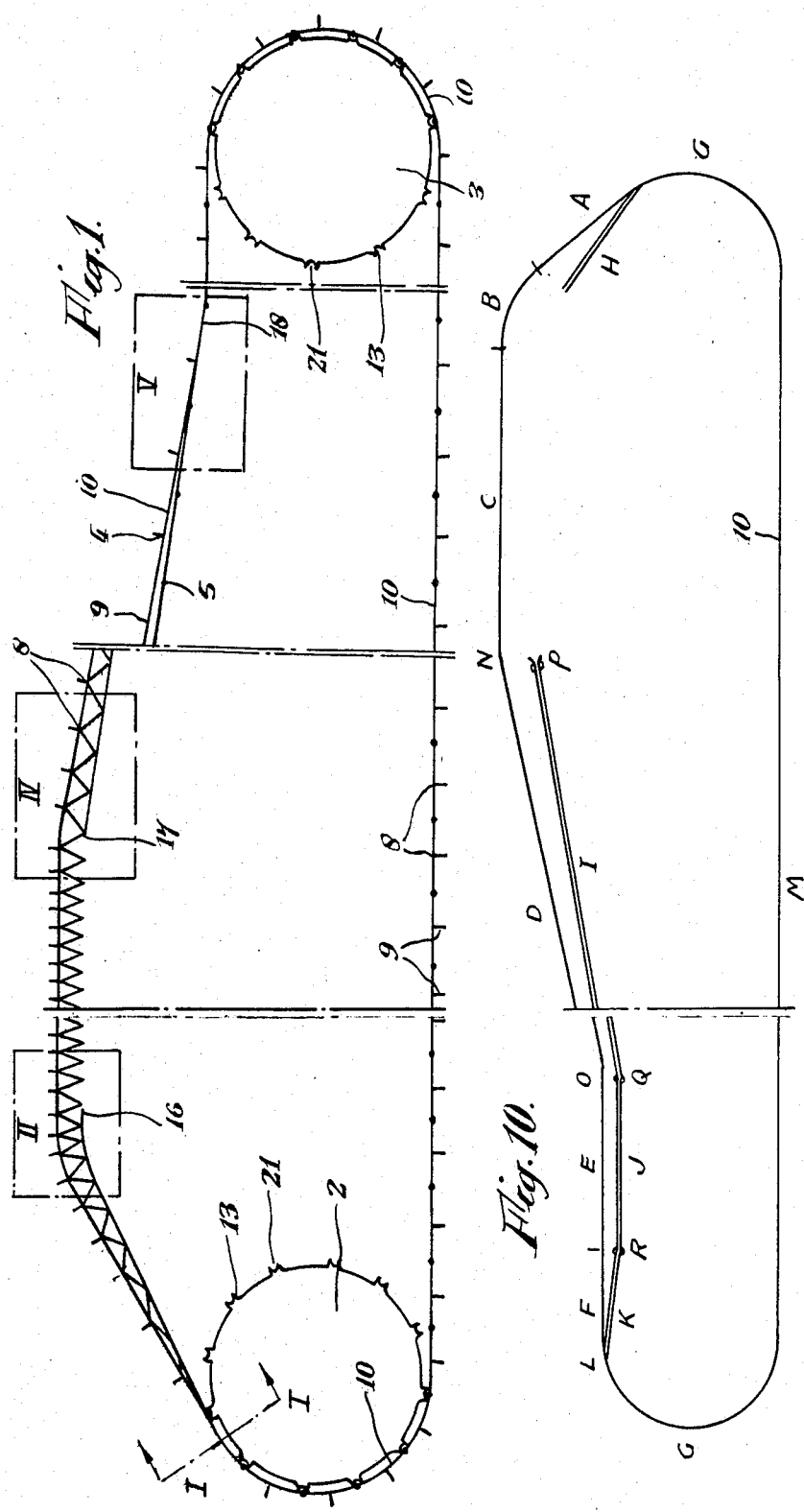
FIG. 1 shows a general layout for one form of apparatus.
FIG. 10 shows an arrangement for the primary and secondary guide means of one form of an adjustable ratio apparatus.

Referring to the drawings, the apparatus comprises an endless articulated chain consisting of a plurality of links 1 which passes round a lead-in sprocket 2 and a lead-out sprocket 3. Each link is pivotally connected to adjacent links at points 4 and 5 by member 6 and 7 respectively which at each end project beyond the links through plain bearings. Of course ball or roller bearings, for example could be provided alternatively. Each member 6 is also the axle for a wheel 14 of a wheeled carriage 8 which bears a gripping device 9 for the web to be stretched. Each carriage 8 which is of substantially C-shaped cross-section rides on primary guide means in the form of continuous rail 10 through wheels 14 and 22a, 22b and 22c. The rail 10 mounted via brackets onto suitable frame-work is machined to have surfaces 33,34,35 on which the wheels of the carriage may run. The surfaces 34 and 35 are each at an angle of 45° to surface 33. This arrangement is such that rotation of carriage 8 about three mutually perpendicular axes is restricted. The four wheels 14, 22a, 22b and 22c respectively can rotate freely about members 6, 36, 37 and 38. The wheels may have any suitable low friction bearing such as plain, ball or roller bearing but advantageously the wheels are ball races having a frictional co-efficient of 0.001 to 0.003. Although for convenience, carriage 8 is shown as having four wheels 14, 22a, 22b and 22c, it is preferred that wheels 22a and 22c should each be replaced by a pair of spaced apart wheels of similar orientation to wheels 22a and 22c.

Members 7 are guided intermittently by secondary guide means 12 which they engage through bearing 11. Sprockets 2 and 3 have theeth 13 shown to have recesses 21 which can positively engage members 7 through bearings 19, to drive the articulated chain. Conventional sprocket teeth are however preferred which are profiled to engage the bearings at substantially more than point contact and to release the bearings smoothly as the drive is removed therefrom.

As can be understood from FIG. 2, sprocket 2 (not shown) engages guide members 7 via bearing 19 and drives them into the secondary guide means 12 which has the form of a channel-shaped track. The engagement end 15 of secondary guide means 12 is shown to have a slight bell-mouth 23 to assist location of bearing 11. The face 20 of carriage 8 carries a gripping device (not shown in FIG. 2).

The web gripping devices employed in the apparatus of the present invention may be of any type which can be made, for example, by cam means, to grip the edge of the web to be stretched at the beginning of the working run of an articulated chain, that is to say that part of the path of each chain wherein the chain is in engagement with the web through the gripping devices, and to release the edge of the web, for example, by cam means, at the end of the working run. Many types of such gripping devices are well known to persons familiar with the stretching of plastics webs and they may be mounted on any convenient part of, or attachment to, the articulated chain providing that when the chain is caused to expand the distance between adjacent gripping devices increases. The gripping devices are preferably attached to the carriages, desirably in such a position that the gripping area of each device is in such position relative to its carriage that the distance travelled by the mid part of the gripping area as the carriage enters or leaves a curve in the guide means is substantially the same as that travelled by the carriage. In this case, any acceleration or retardation of the said points in their direction of motion when the carriages enter or leave a convex or concave, curve respectively, or pass over a portion o the primary guide means of varying curvature, is limited. A further advantage is that the twisting moments applied to the carriages by the gripped web, especially during start-up, are considerably reduced.

FIGS. 3 and 4 show the arrangements of primary and secondary guide means, 10 and 12 respectively which cause the articulated chain to fold progressively in response to a compressive force applied in the generally intended direction of motion of the chain, in controlled manner prior to and during passage of the chain round a curve. It is preferred however, that the folding is completed before the curve is reached thus enabling the secondary guide means to be straight and also to be terminated before the curve. On completion of the folding of the chain at which point the carriages abut against one another via spacing projections thereon, (not shown), the secondary guide means 12 is terminated at 16.

FIG. 4 shows a detail of the relative dispostion of the members 6 and 7, wheel 14 and bearings 11, 19 and primary and secondary guide means 10 and 12 respectively during folding of the articulated chain.

FIG. 5 shows the re-engagement of the secondary guide means 12 by the secondary guide member 7 through bearings 11 (not shown) at the commencement of the expansion of the fully folded articulated chain. Bell-mouth 17 assists the engagement of bearings 11 at the entrance end of an expansion-control section of the secondary guide means 12.

FIG. 6 shows the arrangement signified generally by 18 in FIG. 1 whereby, when the controlled expansion of the chain is complete, the secondary guide means is disengaged in smooth manner.

FIG. 7 illustrates in simplified form how the secondary guide means 12 may be curved with respect to the straight primary guiding means 10 in order to achieve a substantially uniform rate of stretch over substantially the whole length of a portion of the apparatus in which the primary guide means on the two sides of the apparatus diverge. The curved portion of the secondary guide means 12 is shown in more detail in FIG. 8. To facilitate a smooth transition of the bearings 11 from the secondary guide means 12 to the primary guiding means 10 when the articulated chain is substantially fully expanded, it may be desirable to apply the formula given hereinbefore over the initial part (a) of the secondary guide means 12, for example the initial two-thirds, the curve for the remainder (b) of the section of secondary guide means 12 being derived empirically. By way of illustration, where the length of the secondary guide means 12 was 65 inches, the ultimately required longitudinal stretch ratio was 4:1 and the distance between pivotal connections on each link was 3 inches, the above-given formula was applied to derive the curvature of the initial 40.5 inches of the guide means 12. The curvature of the remaining 24.5 inches was derived by trial and error to achieve an optimum smoothness of transition to the fully-expanded state of the chain.

Figure 9:
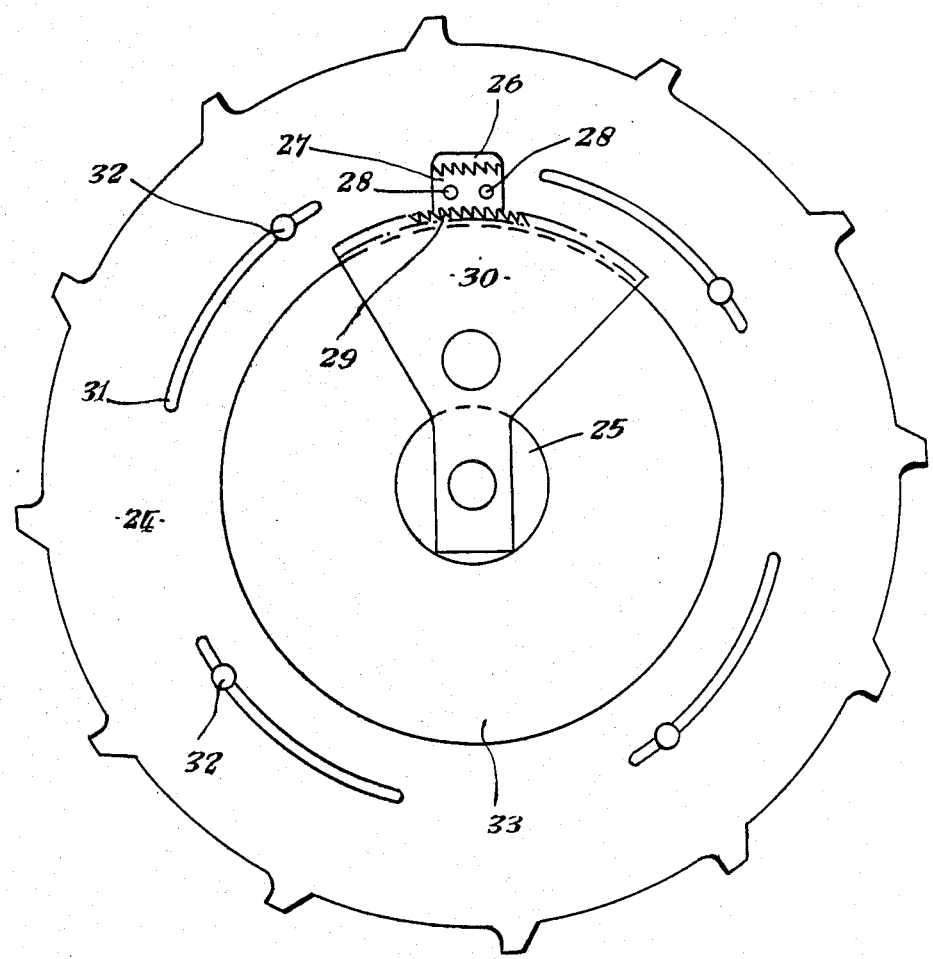
FIG. 9 shows one form of adjustable sprocket for use in the apparatus.

FIG. 9 illustrates a preferred design for an adjustable sprocket comprising peripheral toothed portion 24 and a central boss 33 which includes the drive shaft 25. A recess in the toothed portion 24 accommodates a thoothed locking key 27 which may be secured to the boss 33 by bolts 28. Locking key 27 bears two sets of teeth each set being offset with respect to the other by a distance p where p is the pitch of the teeth, and is reversible so that either set of teeth may engage with corresponding teeth 29 on vernier plate 30 secured to the drive shaft. Peripheral toothed portion 24 bears arcuate slots 31 and may be secured to the boss 33 by bolts 32. When adjustment is required, locking key 27 is removed from recess 26 by first removing bolts 28 and lifting the key clear of the recess 26 and teeth 29. The peripheral toothed portion 24 is then released by loosening bolts 32 whereupon the toothed portion 24 may be rotated relatively to the drive shaft. When the desired position of the peripheral toothed portion 24 has been found the locking key 27 is inserted in the recess 26 with the most favourably disposed set of teeth in engagement with teeth 29. The key is secured with bolts 28 and then bolts 32 are tightened to complete the operation.

FIG. 10 illustrates one form of apparatus in which the longitudinal and/or transverse stretch ratios may be adjusted, for simplicity, only the primary and secondary guide means are shown. The primary guide means is shown as a continuous rail 10 which is advantageously of the form shown in FIG. 2 comprising chain-folding and in-going sections A and B, preheat section C, stretch section D, annealing and/or cooling section E at the end of which the stretched web would normally be released, chain-unfolding section F, arcuate end sections G, and return section M. The secondary guide means, preferably of the form shown in FIG. 2 has a chain folding section H, a stretch section I, a section J parallel to E and un-folding section K. The primary guide means is adapted to bend about points N and O. Section B of the primary guide means is removable and the positions of sections C and D are adjustable, for example, on slides movable relative to a base member by the operation of lead screws, the slides being such as to allow the Primary guide means to move longitudinally of the apparatus as necessary when adjusting the transverse dispositions of C and D. The secondary guide means H is in fixed relation to A, for a given link length, and positioned such that the chain is completely folded as it leaves its free end. Hinge point P for I is in fixed relation to N for a given link length. J, which is hingedly connected at Q to I and to K at R, is moveable relative to E in parallel fashion via for example lead screws and slides, which may also allow longitudinal positioning, and the out-goint end of K may be arranged to be in sliding contact with the primary guide means at L where the primary and secondary guide means merge into one another. Hinge joints Q and R may be movable such as to allow J and K to move longitudinally of the apparatus as I moves about hinge point P. To adjust the transverse stretch ratio (while keeping the outgoing width of the stretched product to be produced constant) the articulated chain is parted in the region of the junction between A and B, the chain is then removed from section B by pulling the chain carried by carriages of the preferred form down the stretch section and round into the return run M where the excess links may be freely folded. Section B of the primary guide means is then removed. The sections C and D are then unclamped and adjusted by means of lead screws operating travellers on which the sections can also move longitudinally of the apparatus. In adjusting sections C and D, bending of the rail occurs about points N and O. When the new position for sections C and D have been reached, the sections are clamped. A replacement rail section (not shown) is then inserted in place of the original B section to connect rail sections A and C. The chain is then pulled out of the return run if necessary after some links and carriages have been added or removed to fill the replacement rail section and the chain reconnected. Because hinge point P is fixed with respect to N, and in this context Q with respect to O, it will be appreciated that the longitudinal stretch ratio remains unaltered. To adjust the longitudinal stretch ratio, sections of the secondary guide means I, J, K and hinge joints Q and R are unclamped and the relative position of section J parallel to E, adjusted. Adjustment of J alters the angle of I with respect to D, the degree of folding at the end of the stretch section, and therefore the ratio of longitudinal stretch achieved therein. Adjustment of J in parallel manner, for example by means of co-operating lead screws, must of course result in some longitudinal movement of the section itself as described, and/or in movement within the joint Q, for which additional or indeed alternative provision can be readily made, for example, by providing sliding surfaces. Likewise, hinge joint R may be longitudinally extendable or retractable and/or the position at which K converges to F at L moveable. For example K may be merely in sliding sprung contact with F at L. On completion of repositioning the secondary guide means, the sections are preferably re-clamped. It will be appreciate that, in making any adjustment by the means described, either to the longitudinal or transverse stretch ratios, the amount of chain in the forward run will be altered. Thus, it must be appreciated that either links will be required to be added or removed from the system or, as is preferred, for convenience, use must be made of a bank of folded links, maintained in the return run.

In the arrangement shown, the chain is fully extended for passage around arcuate sections G, when sprocket drive is provided over these sections. When the apparatus is run with the chain in the folded condition in the return run M, cams will be provided to initiate folding of the chain as it enters the return run and to unfold the chain before, or as, it leaves the return run. It will be further appreciated that the ratio of link length/minimum-folded-width limits the maximum longitudinal stretch ratio for a given link and extension of the range of adjustment will require a change of link length. This may be effected by complete replacement or by employing for example, telescopically adjustable links.

Operation of the apparatus in FIGS. 1 to 10 is as follows. The articulated chain formed of links 1 is driven round the path defined by rail 10 by sprockets 2 and 3, the teeth of which engage members 7 through bearings 19. Members 6 mounted on carriages 8 running on rail 10 guide one end of each link along the path defined by rail 10. When the articulated chain is in the fully expanded state (including its passage round sprockets 2 and 3) guide members 7 follow members 6 and are steadied by bearings 11 engaging the inside surface of rail 10. At a point where the path of the chain is substantially tangential to lead-in sprocket 2 on its exit side, guide members 7 through bearings 11 engage secondary guide means 12 thus causing the articulated chain to fold, the angle between the rail 10 and secondary guide means 12 at any point being such as to cause the articulated chain to continue to fold progressively as it travels along the path between the lead-in sprocket and the point where the chain is folded to the extent that adjacent carriages 8 abut one another, preferably via spacing projections thereon. At this point shown as 16, but which is preferably situated at or before the curve, the secondary guide means is dis-engaged. The gripping devices 9 mounted on carriages 8 are then rbought into operation (by means not shown) at a point beyond the curve to grip the edge of the web to be stretched and the web while being brought to a condition suitable for stretching is carried along by the chain to point 17 where secondary guide means 12 is re-engaged by bearings 11. The angle between the rail 10 and the re-engaged section of the secondary guide means 12 is arranged such as to control the rate of expansion of the articulated chain as it is pulled along its path by sprocket 3. As the articulated chain expands, the distance between the carriages 8 and thus between the gripping devices 9 increases thus causing the web to be stretched in the longitudinal direction. At the end of the stretching operation, and when the chain is substantially fully expanded, secondary guide means 12 is again dis-engaged at point 18. The gripping devices are then caused to release the web (by means not shown) which is drawn off by separate apparatus. The fully expanded articulated chain then passes round sprocket 3 and follows the path defined by rail 10 back to and round sprocket 2 to complete one cycle of operation. It is normally arranged that there is some delay in releasing the web at the end of the stretching operation and that the web is held in the stretched condition for a cooling and/or an annealing treatment after which it is released. If the chains are not fully extended at the end of the stretching section, such as may be the case in the apparatus of FIG. 10, the web will normally continue to be gripped, in the cooling and/or annealing zone while the chain is maintained at a stable degree of fold and will be released after cooling and/or annealing before the chain is arranged to complete its extension at the out-going end of the apparatus.

Certain thermoplastics materials are known to be oriented by stretching to give products having markedly improved physical properties such as increased tensile modulus. Examples of such theremoplastics materials include polystyrene, high- and low-density polyethylene, polypropylene, poly-4-methyl pentene-1, polyvinyl chloride, polyvinylidene chloride, polyamides and linear polyesters. Such materials may be stretched uniaxially or biaxially and in the latter case the stretching along two different axes may be effected sequentially or simultaneously. The apparatus described in U.S. Pat. No. 4,614,011 may be operated to stretch material in any of these ways and therefore any of these way may be used in the process of the present invention.

However, when a web to be stretched biaxially comprises a crystallisable polymer such, for example, as high-density polyethylene, polypropylene or polyamide, it may be advantageous to effect biaxial stretching simultaneously in the two directions, since the high risk of splitting, particularly evident in a uniaxially oriented film of such materials, is then almost eliminated. Further, when the web to be stretched comprises a mixture of mutually incompatible polymers, it is sometimes extremely difficult to carry out the second stretching step of a sequential biaxial orientation process because there is a high risk of undesirably splitting the web along the direction of the initial orientation. Clearly, in such cases, simultaneous biaxial stretching may have great advantages.

The temperature of the thermoplastics web during a stretching operation has a considerable bearing on the physical properties imparted to the stretched material. For non-crystallisable materials, such as atactic polystyrene, stretching must be carried out above the glass transition temperature when the polymer is in a rubbery amorphous condition. For crystallisable polymers such as polypropylene, linear polyester and nylon, for example, orientation is advantageously carried out at temperature above the glass transition temperature but below the crystalline melting point in order to obtain optimum physical properties in the stretched products. The effect of orientation on the physical properties of the thermoplastics web can be to decrease the elongation-at-break value and to increase the stiffness and tensile modulus. These properties of high stiffness and tensile modules are especially valuable in webs intended for use as synthetic papers. The ability to induce improvements in the stiffness and tensile properties in webs comprised of a mixture of two or more resin components has a particular advantage in this field arising from the possibility of modifying the surface characteristics of the web during the stetching process, especially if the resin components are mutually incompatible. The surface characteristics are all important in stretched webs intended for graphic applications. Mixtures of resins which form a particularly suitable basic matrix for synthetic paper comprise mixtures containing from 5 to 100 parts of a styrene polymer per 100 parts of a molecularly orientable base resin. Suitable base resins for these mixtures either alone or in combination include for example, polyolefins such as homo- and co-polymers of ethylene, propylene, 4-methyl pentene-1 and butene-1, polyamides, linear polyesters such as polyethylene terephthalate and polyvinyl resins such as homo- and co-polymers of vinyl chloride and vinylidene chloride. Especially suitable base resins for these mixtures are polyolefins, such as high-density polyethylene and isotactic polypropylene. When a web comprised of such a mixture is biaxially oriented in addition to the properties imparted by orientation, the presence of the styrene polymer contributes to the stiffness of the product and renders it more paper-like.

Accordingly, a preferred embodiment of this invention is a process for the manufacture of a synthetic paper product wherein a web comprising a thermoplastics resin composition containing a mixture of
(a) 100 parts of base resin comprising high-density polyethylene and/or polypropylene and
(b) 5 to 100 parts of a styrene polymer
said parts being by weight, is stretched by passage through a stretching apparatus as described in U.S. Pat. No. 4,614,011 the web being stretched uni-axially or biaxially at a temperature lying in the range between the crystalline melting point and the glass transition point of the high density polyethylene or of the polypropylene. When the base resin is a high-density polyethylene the temperature of the web during stretching preferably lies in the range 115° to 130° C. and the corresponding range for polypropylene is preferably 130° to 160° C. As high-density polyethylene, there are used homo- or co-polymers of ethylene having a density lying within the range from 0.94 to 0.97 gm/cc, the copolymers being co-polymers of ethylene and other copolymerizable aliphatic hydrocarbon monomers and consisting predominantly of polymerised ethylene, for example, a 90:10 by weight copolymer of ethylene and propylene. The high-density polyethylenes advantageously exhibit Melt Flow Indexes (measured according to BS2782, Part 105C) of from 0.001 to 2.0 and preferably 0.15 to 0.5 decigram/minute. Mixtures of high-density polyethylenes, as defined, may be used and, in such mixtures, components may exhibit an MFI less than 0.001 or greater than 2.0 decigrams/minute, provided the MFI of the mixture is from 0.001 to 2.0.

Polypropylenes are preferably substantially isotactic. Copolymers of propylene and other copolymerisable monomers, which copolymers consist predominantly of polymerised propylene, for example, propylene/ethylene copolymers containing up to 8% polymerised ethylene may also be used. The polypropylenes generally have a density lying in the range from 0.90 to 0.91. The resins advantageously exhibit a Melt Flow Index (measured by the procedure of BS2782 105C but at a temperature of 230° C.) of from 0.01 to 4.5, preferably 0.05 to 2.0 decigrams/minute. As is the case with high-density polyethylene, mixtures of polypropylene resins may be employed.

The glass-transition point (or, as it is also known, "the glass transition temperature") of a high-density polyethylene or a polypropylene can be measured by various well-known means. Where the polymer exhibits multiple transitions, the temperature selected for the purpose of definition in the preferred embodiment of th invention should be that which has been described as Tg (U) by R. F. Boyer (Plastics and Polymers p 15 1973 (February).

The crystalline melting point of a crystallisable polymer such as a high density polyethylene or a polypropylene is for the purpose of this invention defined as that temperature above which crystalline regions cannot be recognised, for example, the temperature when spherulites disappear when a sample of the polymer is heated while being examined by means of a polarising microscope. Melting points of commercially available polyolefins, for example, are found to be of the order of 135° C. and 175° C. for, respectively high-density polyethylene and polypropylene.

The styrene polymers may be homopolymers or copolymers of styrene or one of the closely related methyl substituted styrenes wherein one or more methyl substituents are present on the aromatic ring, which copolymers may be produced from said styrene or substituted styrene and a copolymerisable monomer such as, for example, butadiene, acrylonitrile, acrylic and methacrylic esters. Copolymers of styrene and a methyl substituted styrene with or without additional comonomers may also be used. Further, the styrene polymer may be a graft copolymer derive by polymerising styrene or substituted styrene in the presence of a rubber such as a butadiene polymer or styrene/butadiene polymer rubber. In all cases, however the copolymer should contain at least 50% by weight of polymerised styrene and/or substituted styrene. It is preferred that the styrene polymer employed should be a homopolymer of styrene having an intrinsic viscosity of at least 0.6 and preferably of from 0.6 to 1.1 measured in toluene at 25° C. The styrene polymer resin can be used in the process of the preferred embodiment in an amount of from 5 to 100 parts by weight per 100 parts by weight of high-density polyethylene and/or polypropylene but amounts of from 30 to 50 parts per 100 parts of high-density polyethylene and/or polypropylene are preferred.

The styrene polymers may contain small amounts of lubricants, such as butyl stearate, liquid paraffin and the like. Improved processing characteristics of the thermoplastic resin composition employed in the process of the preferred embodiment, with consequently improved products, may be obtained by incorporating a rubbery polymer or coplymer in an amount in the range 0.5 to 20 parts per 100 parts of high-density polyethylene and/or polypropylene. As an example of a suitable rubber there may be mentioned a copolymer of butadiene and styrene having a butadiene content of 70% to 90% by weight. Duradene, (supplied by I.S.R. Ltd). is a 75:25 butadiene/styrene copolymer and Solprene 1205 (supplied by Phillips Petroleum Ltd.) is a 75:25 butadiene/styrene block copolymer rubber both of which are suitable for incorporation into the resin composition used in the process of the preferred embodiment. An increase in the tear strength of the product has been observed when such a rubber has been incorporated in the resin composition used in the process of the preferred embodiment of this invention.

Improved products may also be obtained in the process of the preferred embodiment, especially when the thermoplastic resin composition contains dispersed pigment or filler, if 2 to 20 parts preferably 2 to 12 parts by weight per 100 parts by weight of high-density polyethylene and/or polypropylene, of an ethylene/vinyl copolymer resin, having a Melt flow Index of from 0.2 to 100 decigram/minute, are incorporated which assists homogenization of the mixture and aids the dispersion of pigments and/or fillers. The ethylene/vinyl copolymer resin which may be employed is a copolymer of ethylene and a copolymerisable vinyl monomer. Ethylene/vinyl copolymer resins useful in the process of the preferred embodiment are, for example, thermoplastic copolymer resins which exhibit an MFI of from 0.2 to 100 decigrams/minute and preferably 0.2 to 20 decigrams/minute. Resins exhibiting an MFI of from 0.2 to 5.0 decigrams/minute are most preferred. The ethylene/vinyl copolymer resin which should contain a predominant amount of the ethylene polymerized in the copolymer, preferably from 70 to 95% polymerized ethylene, may be, for example, an ethylene/vinyl acetate copolymer, an ethylene/ethyl acrylate copolymer or an ethylene/acrylic acid copolymer. Especially preferred is an ethylene/vinyl acetate copolymer.

The thermoplastics resin used in the precess of the present invention may contain pigments and/or fillers to impart colour and/or opacity. Examples of such pigments and fillers include titanium dioxide, zinc/oxide, calcium carbonate, china clay and mixtures thereof. In the process of the preferred embodiment, pigments and/or fillers may be employed in amounts ranging from 0 to 100, preferably 5 to 50 parts by weight per 100 parts by weight of high-density polyethylene and/or polypropylene.

The thermoplastic resin used in the process of the present invention may further contain other additives such as thermal and U.V. stabilisers, antioxidants and antistatic agents.

The compositions used in the process of the preferred embodiment of this invention are advantageously compounded in a compounding extruder or in a Banbury Mixer before being converted into chip form in a disintegrating or grinding machine. These chips may then be fed to, for example, an extrusion machine fitted with a sheet die for the production of the thermoplastics web.

In operating the process of the present invention, a web comprising thermoplastics resin is fed to the ingoing end of a stretching apparatus as described in U.S. Pat. No. 4,614,011 and marginal portions of the web gripped by the gripping devices at the beginning of the working runs, the gripping devices preferably heated to a temperature approximating the termperature at which stretching of the web is to be effected. The web may be fed to the machine in a condition already suitable for stretching. However, the web may be brought to this suitable stretchable condition whilst it is being carried along by the chains prior to the stretching section of the apparatus being reached. It will be appreciated that the apparatus described in U.S. Pat. No. 4,614,011 may be adapted to stretch uniaxially or biaxially and in the latter case simultaneously or sequentially. The stretching ratio in any one direction for which the apparatus should normally be adapted is at least 2:1. However, we have found that stretch ratios lying within the range of 3:1 to 10:1 may be applied in the longitudinal and transverse directions to webs made from compositions employed in the process of the preferred embodiment and when employing high-density polyethylene as the base resin, the stretching ratio is preferably in the range from 3:1 to 5:1 and most preferably in the range of 3.5:1 to 4.5:1 in the longitudinal direction and 3.0:1 to 4.5:1 in the transverse direction, the stretching being such that it is effected biaxially simultaneously. When employing polypropylene as the base resin, the ratios are each preferably in the range 4:1 to 7:1 and again simultaneous biaxial stretching is preferred. The web may be supplied from any source such as an extruder, calender or supply reel. In the process of the preferred embodiment and when the base resin is high-density polyethylene, the web is in an especially suitable condition for simultaneous biaxial stretching when its temperature is in the region 120° to 130° C. and it is preferred that the web is initially extruded from the die of an extrusion machine at a temperature in the region 190° C. to 230° C. and its temperature adjusted to about 100° C. before it is fed to the stretching apparatus where it is then reheated, in a pre-heating section to the stretching temperature before being stretched. Such adjustment can be effected using any means such as cool air blowers, sprays, cooling drums and calender rolls that may be followed, if desired, by re-heating apparatus. In this way, it is believed the web is conditioned so as to effect optimum distribution of temperature and development of crystallinity within the web. The web thus conditioned is then fed continuously into the stretching apparatus where marginal portions on each edge of the web are progressively gripped by the gripping devices of the apparatus as the web reaches the beginning of the working runs of the endless chains.

In order to bring the web to a temperature suitable for stretching and/or to maintain such a temperature during the stretching operation and, indeed, to attain and/or maintain a suitable temperature during any subsequent annealing operation, the stretching apparatus preferably has an oven or ovens associated with or connected with it.

It is often desirable after having stretched the thermoplastics web to hold the stretched web in the stretched condition at a temperature substantially equal to the stretching temperature for a short period to facilitate annealing of the web and improve the distribution of stresses before cooling and releasing the stretched web from the gripping devices, such that a web of improved flat-lying behaviour and dimensional stability at room temperature, may be obtained.

Accordingly, the stretching apparatus may have an annealing section in which the web may be maintained in a substantially constantly-stretched condition while it is passed through, for example, a further oven or oven zone before being cooled and released. Cooling of the web may be by natural cooling or may be by forced cooling effected by using, for example, air blowers. Such cooling may be effected in a cooling section of the apparatus wherein the web is maintained in a substantially constantly stretched condition although a slight toe-in of the gripper paths in this section is often desirable. In the process of the preferred embodiment wherein simultaneous biaxial stretching of the web is effected, an annealing section in which the web may be maintained in a substantially constantly stretched condition comprises a section wherein the expanded articulated chains are caused to travel parallel to one another at a distance apart corresponding to their distance apart at the end of the transverse stretching section, the degree of expansion of the chains being maintained substantially constant. In the process of the preferred embodiment and when the base resin is high-density polyethylene, the temperature of the web in such an annealing section of the apparatus is preferably maintained at 100° C. to 130° C. for a period of from 5 to 30 seconds. After this annealing stage, the web is preferably cooled before being released, and after being released it is either cut and stacked as flat sheets or batched in the form of mill rolls.

The web produced according to the process of the preferred embodiment should normally be surface-treated if it is to be printed and it has been found that an electrical corona discharge, applied to one or both faces of the web after it has been cooled and prior to sheeting or mill-batching, provides a convenient means of imparting satisfactory printability to the stretched web. The degree of corona discharge treatment applied to the sheet should be sufficient to make the contact angle between a treated face of the web and water less than 75° at a temperature of 25° C.

The thickness of a web made by the process of the preferred embodiment of this invention may be between 0.002 inch and 0.010 inch. The web product has excellent dimensional stability in moist conditions, has very high initial tear strength and is printable by currently-used methods including flexography, gravure, letterpress, offset lithography and silk screen. Its excellent flat-lying behaviour lends itself to satisfactory stacking.

When operating the process of the preferred embodiment of the present invention and with high-density polyethylene as the base resin, the production of a commercially acceptable product necessitates stretching the web at least 3:1 in both longitudinal and transverse directions. When the process was operated with the thermoplastics composition and the operating conditions given below in Example I, but arranged to give products with stretch ratios of 2.5:1, 3:1, 4:1 and 5:1 in both longitudinal and transverse directions, the following results were obtained:

| Stretch Ratio | Tensile strength $10^3$ lb/in$^2$ | Breaking Elongation | Gauge Variation of product. |
|---|---|---|---|
| 2.5:1 | 5.0 | 40 | Considerable |
| 3:1 | 5.7 | 100 | Small |
| 4:1 | 9.0 | 150 | Small |
| 5:1 | 9.4 | 95 | Small |

The tensile test results are average values obtained by the test method of BS1133.

These results show that in the process of the preferred embodiment and with high-density polyethylene as the base resin, the production of a satisfactory product necessitates stretch-ratios in excess of 2.5:1, with commercially acceptable products being obtained at stretch-ratios between 3:1 and 5:1.

It will be appreciated that the stretchable thermoplastics webs employed in the process of this invention may be modified webs, for example, perforated or coated webs, and may comprise part of a stretchable laminate.

The process of this invention is particularly suitable for use in the production of stretched thermoplastics webs having flat-lying properties and is also particularly suitable for use in the continuous manufacture of stretched thermoplastics resin webs. The following Examples are given to illustrate the process of this invention.

EXAMPLE 1

The following materials were taken in the proportions (by weight) given:

| | |
|---|---|
| High density polyethylene | 100 |
| Polystyrene | 41.2 |
| Butadiene/styrene copolymer | 7.9 |
| Ethylene/vinyl acetate copolymer | 7.9 |
| Titanium dioxide | 29.5 |
| Calcium carbonate | 9.8 |
| Armourstat 300 antistatic agent | 0.49 |

The high-density polyethylene was Rigidex 2000 (supplied by B.P. Chemical Co.) having a density of 0.95 gms/cc and a melt flow index of 0.2. The polystyrene was Crystal Polystyrene Sternite ST 30 UL (Sterling Moulding Materials Ltd.) having an intrinsic viscosity of 0.75. The Butadiene/styrene copolymer was Duradene Rubber (supplied by I.S.R. Co. Ltd.) having a butadiene:styrene in the proportions 75:25. The ethylene/vinyl acetate copolymer was Alkathene EVA copolymer A9839 (supplied by I.C.I. Ltd.) having ethylene:vinyl acetate in the proportions 82:18 and a melt flow index of 2 decigrams/minute (BS2782). The calcium carbonate was Calopake F (J & E Sturge Ltd.) The Armourstat 300 was an amine type antistatic agent made by Armour Hess Ltd.

The ingredients listed above were compounded in a Banbury mixer to a homogeneous gel which was sheeted out, cooled and diced. The diced material was then fed to a screw-type extruder from which it was extruded as rods, cooled and cut into pellets of maximum diameter 3/16 inch. The pellets thus produced were dried for eight hours at 90° C. and were then fed to a 3½ inch diameter screw-type extruder, the barrel temperature of which ranged from 146° C. at the feed-hopper end to 211° C. at the die-end, a sheeting die being fitted and maintained at a temperature of about 205° C. Sheet of approximate width 15½ inches and thickness 0.090 inch was extruded from the die, at a rate of 160 lb/hour.

After leaving the die, the sheet was passed through a vertical three roll calender to size the sheet to a thickness of 0.064 inch and to a width 15 inches and to cool the sheet to a temperature of about 100° C. The sheet was then passed in to a three-zone circulating air oven system, the zones corresponding respectively to the pre-heating, stretching and annealing sections of a stretching apparatus as described in U.S. Pat. No. 4,614,011 with reference to FIGS. 1 to 9 of that specification and incorporating the preferred features also described particularly with reference to said drawings, the pre-heating and annealing sections and also a cooling section being such that the grippers on each side of the apparatus were arranged to run substantially parallel to one another but with a slight toe-out in the pre-stretching section to maintain the sheet taut during heating and a slight toe-in in the cooling section to allow for some shrinkage of the sheet during cooling and to prevent premature release of the stretched sheet. The stretching section was arranged to effect a simultaneous biaxial stretch of 4:1 in both the transverse and longitudinal directions, the rate of stretching in both directions being arranged to be substantially uniform over the whole section. The lengths of the pre-heating, stretching annealing and cooling sections were approximately 9 feet, 6 feet, 8.5 feet and 10.5 feet respectively. The oven system was provided with heaters, fans and baffles to aid control of the temperature of the air circulating immediately above and immediately below the sheet. It was arranged that the temperatures of the air in the zones were:

|  | Zone 1 | Zone 2 | Zone 3 |
|---|---|---|---|
| Above sheet | 145° C. | 122° C. | 120° C. |
| Below sheet | 148° C. | 125° C. | 120° C. |

The sheet temperature was about 126° C. in Zone 2 and in the region of 120° C. to 125° C. in Zone 3. The sheet gripped at its edges by the web gripping devices, which had been pre-heated to about 126° C., at a pitch of 1.5 inches on entering the pre-heating section of the stretching apparatus, was carried through the four sections of the apparatus. On emerging from the oven at the end of Zone 3 and from the end of the annealing section of the apparatus, the sheet was conveyed through the cooling section where the web was cooled by convection and was then released by the grippers and edge trimmed. The sheet was then passed through an electrical corona discharge treatment unit which was adjusted to give a treatment level such that the contact angle of the finished sheet with respect to water was less than 65° (at 25° C.). The finished sheet, which was then reeled at a rate of approximately 20 feet/minute, had a width of 50 inches and a thickness of 0.004 inch. It was flat-lying and could be printed by flexographic, gravure, letterpress, offset lithographic and silk screen methods.

EXAMPLE II

Example I was repeated except that the formulation was replaced by the following:

|  | Parts by Weight |
|---|---|
| High density polyethylene | 100 |
| Polystyrene | 42.4 |
| Ethylene/vinyl acetate copolymer | 7.5 |
| Titanium dioxide | 28.3 |
| Calcium carbonate | 9.4 |
| Amourstat 300 | 0.47 |

The above materials were as specified in Example I.

The 0.004 inch thick sheet produced was flat-lying and exhibited printing properties comparable with those of the sheet produced according to Example I. It will be seen that no butadiene/styrene copolymer was present in the composition of Example II.

EXAMPLE III

Example I was again repeated but this time the formulation was replaced by the following:

|  | Parts by Weight |
|---|---|
| High density polyethylene | 100 |
| Polystyrene | 40.6 |
| Butadiene/styrene copolymer | 7.8 |
| Ethylene/vinyl acetate copolymer | 7.8 |
| Amourstat 300 | 0.23 |

The above materials were as specified in Example I.

The 0.004 inch thick sheet produced was flat-lying and exhibited printing properties comparable with those of the sheet produced according to Example I. It will be seen that no pigment or filler was present in the composition of Example III.

The sheets made in accordance with Examples I to III were compared as shown in the following tables:

|  |  | Example I | Example II | Example III |
|---|---|---|---|---|
| Tear strength | M.D. | 531 | 502 | 708 |
| lb/inch thickness | T.D. | 782 | 637 | 694 |
| Percentage visual transmission of 0.004 inch sheet |  | 11 | 14 | 72 |

EXAMPLE IV

Stretching apparatus substantially as employed in Example I having preheating, stretching and cooling sections of approximate lengths 9 feet, 6 feet and 19 feet respectively and including no annealing section, as such, was employed to produce a thin polypropylene film.

The stretching apparatus was provided with a two zone oven system the two zones corresponding respectively to the pre-heating and stretching sections of the stretching apparatus. The paths of the opposing chains in the pre-heating and the cooling sections were arranged to run substantially parallel. The chains, drive and guide means were adapted and arranged such that a simultaneous biaxial stretch of 6:1 could be effected in the middle stretching section. The two zones of the oven system were each provided with heaters, fans and baffles to facilitate control of the temperature of air circulating immediately above and immediately below sheet passing therethrough. The feed-stock to the stretching apparatus was 0.036 inch thick polypropylene sheet prepared by melt extruding polypropylene moulding powder (Grade PXC 3391, as supplied by Imperial Chemical Industries Limited) of melt flow index 4.5, through a sheeting die and casting the extrudate on to a chilled roller. The resulting sheet was fed to the pre-heating section of the stretching apparatus where its edges were gripped by grippers, which had been pre-heated to a temperature of about 150° C., at a pitch of 1.5 inches, and its temperature was raised to approximately 150° C. before passing to the stretching section where it was stretched at that temperature biaxially simultaneously 6:1 in both the longitudinal and transverse directions. The stretched film produced at a rate of 75 feet/minute which was cooled and then released, had a thickness of 0.001 inch, was glass clear and had a high gloss.

EXAMPLE V

The stretching apparatus and associated oven system employed in Example IV were arranged with guide means such that a simultaneous 2:1 biaxial stretch was facilitated in the middle stretching section with incomplete expansion of the chains therein and maintenance of the chain in the 2:1 expanded state being arranged in the first half of the cooling section whereafter complete controlled expansion was arranged after release of the web. The guide means arrangment was substantially as described with reference to FIG. 10 of U.S. Pat. No. 4,614,011.

Calendered, clear pvc film of width 36.4 inches and of thickness 0.0047 inch, based on a pvc suspension polymer of K-value 62 and containing a thio-tin stabiliser and a lubricant, was fed from a reel of the material into the pre-heating section of the stretching apparatus where the edges of the material were progressively gripped by the web gripping devices, which had been pre-heated to a temperature of about 100° C., at a pitch of 1.5 inches. The temperature of the film was raised such that, on reaching the stretching section where it was stretched, its temperature was approximately 100° C. The stretched film which was cooled on leaving the stretching section and then released from the grippers travelling at a rate of 30 feet/minute, had a width of 71 inches and a thickness of 0.0012 inch. The stretched film was glass clear and had a high gloss.

EXAMPLE VI

Example I was repeated except that the annealing zone of the oven system was omitted, the stretched sheet being allowed to cool by natural convection on leaving the stretching section of the apparatus and while still being gripped, over a section of the apparatus 19 feet in length over which the toe-in of the gripper paths was suitably adjusted. The finished treated sheet had good handling and printing properties.

We claim:

1. In a process for the production of a biaxially oriented plastic web by stretching an orientable heated web of a thermoplastic resin composition extending in longitudinal and traverse directions and having longitudinally extending edges, simultaneously in the traverse and longitudinal directions, by gripping both edges of the orientable web at a plurality of longitudinally opposed locations adjacent to the longitudinal edges thereof with a plurality of opposed web gripping means, each of which is mounted on a separate carriage means, which carriage means are constrained to follow opposed rail means, which rail means are arranged in mirror-image paths and define at least a parallel path section, a first-bend path section, a diverging path section, a second-bend path section and a second parallel path section, which carriage means on each rail means are joined by a continuous chain of articulated links, which chain is driven so as to propel said carriage means along said rail means, whereby said gripping means advance said web along said rail means, which links engage guide means, coextensive with the rail means, at a point upstream of the parallel path section, in a manner which collapses the links and thereby moves the carriages in relatively close proximity to each other upstream of the point at which the web-gripping means mounted thereon grip the edges of the web, which guide means extend along the first-bend path section and along the diverging path section in a manner which unfolds the links and spreads the carriages apart both longitudinally and traversely, thereby biaxially drawing the web, and which guide means extend to the second-bend path section, the improvement wherein the oriented web is a continuous sheet formed from a continuous sheet of the orientable web; wherein the plastic resin composition comprises a mixture of (a) 100 parts by weight of crystalline polyolefin selected from propylene polymers, high density ethylene polymers and mixtures thereof, (b) 30 to 50 parts by weight of styrene polymer, and (c) 0 to 100 parts, per hundred parts (a), of one or both of dispersed pigments and fillers; wherein each of the gripping means has a gripping area with a midpart so disposed with respect to the carriage upon which the gripping means is mounted that the gripping area travels the same distance as that travelled by the carriage in the first-bend and second-bend path sections, thereby minimizing scalloping of the sheet adjacent the longitudinal edge portions thereof; wherein the sheet is heated to 115° C. to 130° C. when component (a) is an ethylene polymer and to 130° C. to 160° C. when component (a) is a propylene polymer; and wherein the sheet is biaxially drawn as the sheet advances over the diverging path section so as to have a final stretch ratio in both the traverse and longitudinal directions in the range of 3:1 to 10:1 in the second parallel path section compared to the first parallel path section.

2. The process of claim 1, wherein component (a) is a high density ethylene polymer and the web is stretched simultaneously biaxially at a temperature of from 120° C. to 130° C.

3. The process of claim 1, wherein component (a) is a propylene polymer and the web is stretched simultaneously biaxially at a temperature of from 130° C. to 160° C.

4. The process of claim 1, wherein component (b) is a styrene homopolymer having an intrinsic viscosity of at least 0.6.

5. The process of claim 1, wherein component (b) is 40 to 50 parts by weight of a styrene homopolymer having an intrinsic viscosity of from 0.6 to 1.1.

6. The process of claim 1, wherein the thermoplastic resin composition also contains from 0.5 to 20 parts by weight per 100 parts by weight of polyolefin of a rubbery polymer of copolymer.

7. The process of claim 1, wherein the thermoplastic resin composition includes dispersed pigment and/or filler and 2 to 20 parts by weight for 100 parts by weight of polyolefin of an ethylene/vinyl copolymer.

8. The process of claim 7, wherein the thermoplastic resin composition includes 2-12 parts by weight per 100 parts by weight of polyolefin of an ethylene/vinyl copolymer.

9. The process of claim 1, wherein component (a) is an ethylene polymer and the web is stretched at a stretch ratio of from 3:1 to 5:1 in each direction.

10. The process of claim 9, wherein the web is stretched at a stretch ratio of 3.5:1 to 4.5:1 in the longitudinal direction and 3:1 to 4.5:1 in the transverse direction.

11. The process of claim 10, wherein the thickness of the stretched web is from 0.002 to 0.010 inch; wherein the component (a) is a high density ethylene polymer and the web is stretched simultaneously biaxially at a temperature of from 120° C. to 130° C.; wherein component (b) is a styrene homopolymer having an intrinsic viscosity of from 0.6 to 1.1; and wherein the thermoplastics resin composition includes dispersed pigment and/or filler and 2 to 12 parts by weight per 100 parts by weight of polyolefin of an ethylene/vinyl copolymer.

12. The process of claim 1, wherein component (a) is a propylene polymer and the web is stretched at a stretch ratio of from 4:1 to 7:1 in each direction; wherein the thickness of the stretched web is from 0.002 to 0.010 inch; wherein component (a) is a propylene polymer and the web is stretched simultaneously biaxially at a temperature of from 130° C. to 160° C.; wherein component (b) is a styrene homopolymer having an intrinsic viscosity of from 0.6 to 1.1; and wherein the thermoplastics resin composition includes dispersed pigment and/or filler and 2 to 12 parts by weight of polyolefin of an ethylene/vinyl copolymer.

13. The process of claim 1 wherein the continuous sheet of oriented web is produced by the successive steps of extruding the thermoplastic resin composition through a sheet die to form a continuous sheet thereof and, while maintaining the thus-produced continuous sheet at an elevated temperature, calendaring the sheet to produce the unoriented web, and biaxially orienting the unoriented web in the manner set forth in that claim.

14. The process of claim 13, wherein the sheet of unoriented web is heated to the selected orientation temperature range as the sheet traverses the first parallel path section.

15. The process of claim 14, comprising the further step of annealing the biaxially oriented sheet.

16. The process of claim 15 wherein the thermoplastic resin composition comprises about 100 parts by weight of high density polyethylene, about 41.2 parts by weight of polystyrene, about 7.9 parts by weight of butadiene/styrene copolymer, about 7.9 parts by weight of ethylene/vinyl acetate copolymer, about 29.5 parts by weight of titanium dioxide, about 9.8 parts by weight of calcium carbonate and about 0.49 parts by weight of an amine-type antistatic agent; wherein the stretch ratio is about 4:1 in both the transverse and longitudinal directions; and wherein the process further includes the step of treating the biaxially oriented sheet with a corona discharge to provide an opaque, paper-like film.

17. The process of claim 15, wherein the thermoplastic resin composition comprises about 100 parts by weight of high density polyethylene, about 42.2 parts by weight of polystyrene, about 7.5 parts by weight of ethylene/vinyl acetate copolymer, about 28.3 parts by weight of titanium dioxide, about 9.4 parts by weight of calcium carbonate, and about 0.47 parts by weight of an amine-type antistatic agent; and wherein the stretch ratio is about 4:1 in both the transverse and longitudinal directions.

18. The process of claim 15 wherein the thermoplastic resin composition comprises about 100 parts by weight of high density polyethylene, about 40.6 parts by weight of polystyrene, and 7.8 parts by weight of butadiene/styrene copolymer, about 7.8 parts by weight of ethylene/vinyl acetate copolymer and about 0.23 parts by weight of an amine-type antistatic agent; and wherein the stretch ratio is about 4:1 in both the transverse and longitudinal directions to produce a sheet with relatively high light transmission.

* * * * *